United States Patent [19]

Ohya

[11] 4,397,486
[45] Aug. 9, 1983

[54] JOINT CONSTRUCTION OF PIPELINE
[75] Inventor: Eizaburo Ohya, Hiroshima, Japan
[73] Assignee: Toyo Kogyo Co., Ltd., Hiroshima, Japan
[21] Appl. No.: 240,062
[22] Filed: Mar. 3, 1981
[30] Foreign Application Priority Data
Mar. 13, 1980 [JP] Japan .................. 55-33253[U]
[51] Int. Cl.³ .................. F16L 19/02; F16L 23/00
[52] U.S. Cl. .................. 285/368; 285/412
[58] Field of Search .............. 285/363, 368, 405, 412
[56] References Cited
U.S. PATENT DOCUMENTS 570,975 11/1896 Anderson .................. 285/412
694,072 2/1902 Pearce .................. 285/363 X
960,899 6/1910 Guyer .................. 285/363 X
3,275,346 9/1966 Gregg .................. 285/363 X
4,097,071 6/1978 Crawford et al. .............. 285/363 X

FOREIGN PATENT DOCUMENTS 708091 4/1965 Canada .................. 285/412
50-21688 7/1975 Japan .

Primary Examiner—Richard J. Scanlan, Jr.
Attorney, Agent, or Firm—Wenderoth, Lind & Ponack

[57] ABSTRACT

An improved joint construction of a pipeline, which is provided with inclined bearing surfaces of fastening members, with respect to the centerline or axis of the pipeline, and arranged to improve the working efficiency in the coupling, ensure the working safety, and also decrease cost required for coupling tools.

8 Claims, 5 Drawing Figures

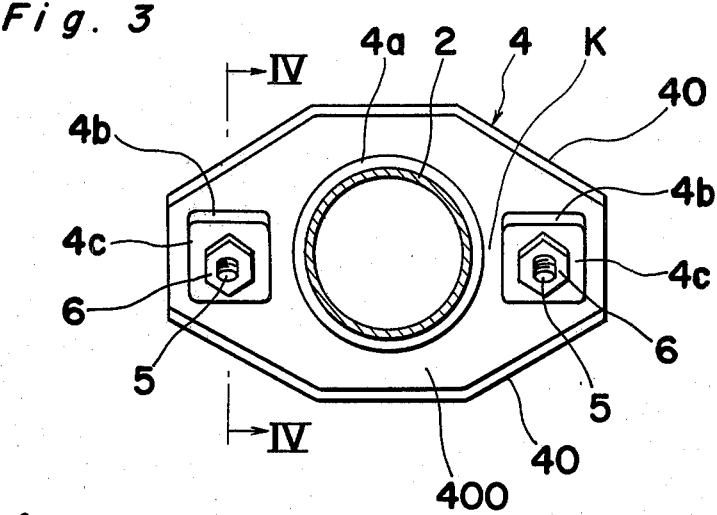
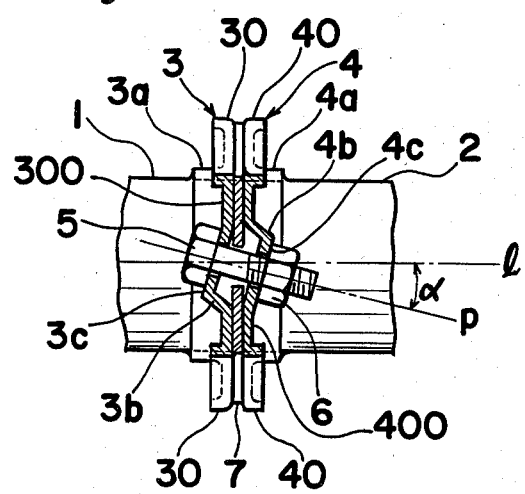
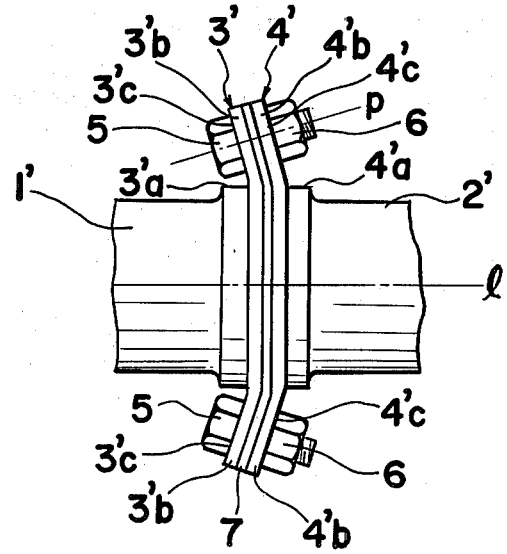

JOINT CONSTRUCTION OF PIPELINE

BACKGROUND OF THE INVENTION

The present invention generally relates to a pipeline and more particularly, to an improved joint construction of a pipeline of exhaust pipes or the like which are provided with flanges at each end thereof so as to be coupled with each other by using fastening members.

Generally, in a conventional exhaust system of an engine for a motor vehicle, as shown in FIG. 1, there has been employed an exhaust passage including an engine a, an exhaust manifold b, an exhaust pipe c, an exhaust pipe d having a catalytical converter g, an exhaust pipe e, and an exhaust pipe f having a muffler h, which are connected with each other in the above order from the engine a to the exhaust pipe f so as to purify the exhaust gas from the engine a and muffle the exhaust noise during discharge of the exhaust gas into the atomsphere. Generally, flanges c1 to f1 have been provided at each end of the exhaust pipes c to f so as to be coupled with each other, at the coupling portions A to D of the exhaust pipes c to f, with the use of fastening members comprising bolts and nuts.

In the conventional arrangement as described above, however, the surfaces of the flanges c1 to f1 have been directed at right angle with the centerline or axis of the pipeline (exhaust pipe c to f) and to be parallel with each other, so that the tightening of the bolts and nuts is required to be performed from the direction in parallel with the centerline of the pipeline. Meanwhile, since the exhaust pipes c to f are provided below a floor i, with a shielding plate j for heat shielding and the protection of the exhaust system being disposed below and in the vicinity of said exhaust pipes c to f, the coupling operation as described above has usually been performed obliquely from below the car body, using an impact wrench with a universal joint type socket. However, in the coupling operation as described above, the direction for tightening the bolts and nuts is different from the direction of operating the impact wrench, so that the universal joint portion has been apt to be damaged owing to a large load applied thereto, thus increasing the expenses required for tools due to the short service life. Moreover, the large rotational vibration of the socket during the tightening has caused mechanics to suffer from tendovaginitis, while deterioration in working efficiency and increased cost of labor have resulted because the nuts are required to be temporarily mounted on the bolts before the tightening. Furthermore, there have been dangers that mechanics may be injured by falling bolts or get burnt by exhaust pipes c to f at high temperatures when loosening the tightened portions with the impact wrench.

SUMMARY OF THE INVENTION

Accordingly, an essential object of the present invention is to provide an improved joint construction of a pipeline for exhaust pipes and the like in which surfaces of flanges with which tightening or coupling members are brought into contact during coupling of the flanges, are inclined with respect to the central axis of the pipeline, so that the pipeline may be combined with the tightening members by the use of an impact wrench having a standard socket portion, without any obstruction or interference with respect to the pipeline (exhaust pipes, etc.), floor, shielding plates and the like.

Another important object of the present invention is to provide an improved joint construction as described above which is simple in structure and highly reliable in actual use, and can be readily incorporated into motor vehicles or the like in general at low cost.

In accomplishing these and other objects according to a preferred embodiment of the present invention, there is provided an improved joint construction of a pipeline of exhaust pipes or the like including flanges provided at each end thereof and having bearing surfaces of fastening members, with the bearing surfaces being inclined with respect to the centerline of the pipeline. In accordance with the present invention, an impact wrench having a universal joint type socket is not required to be used and thus, the pipeline can be coupled by using an impact wrench with a standard (straight) type socket without any interference with respect to the pipeline (exhaust pipes or the like), a floor, a shielding plate, etc.

BRIEF DESCRIPTION OF THE DRAWINGS

These and other objects and features of the present invention will become apparent from the following description taken in conjunction with the preferred embodiment thereof with reference to the accompanying drawings, in which:

FIG. 3 is a cross section taken along the line III—III in FIG. 2, FIG. 4 is a cross section taken along the line IV—IV in FIG. 3, and FIG. 5 is a view similar to FIG. 2, which particularly shows a modification thereof.

Before the description of the present invention proceeds, it is to be noted that like parts are designated by like reference numerals throughout the views of the accompanying drawings.

DETAILED DESCRIPTION OF THE INVENTION

Figure 1:
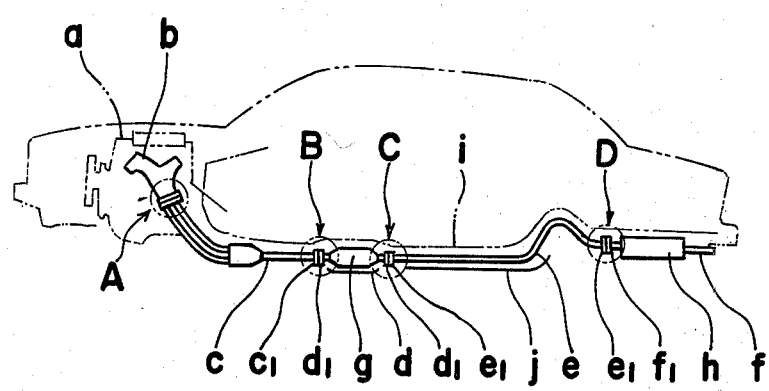
FIG. 1 is a schematic illustration of a conventional exhaust system of an engine for a motor vehicle.
Figure 2:
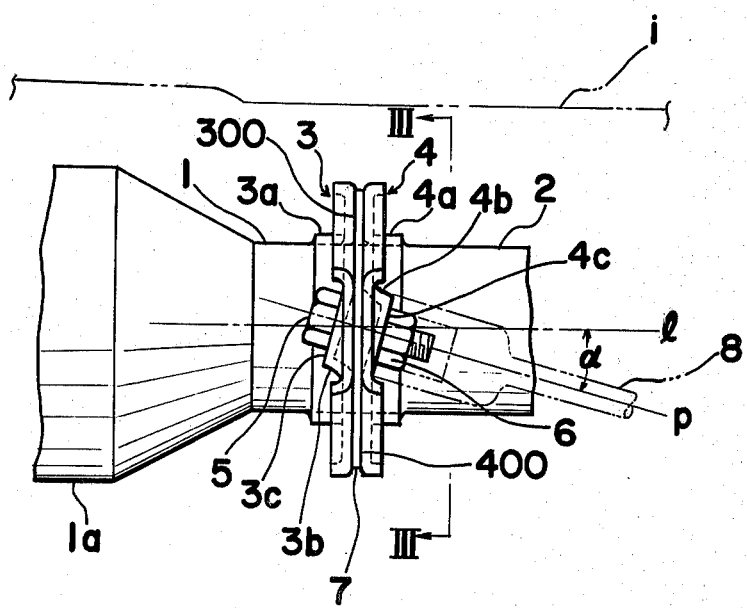
FIG. 2 is a fragmentary side elevational view showing, on an enlarged scale, the arrangement of a joint construction according to one preferred embodiment of the present invention.

Referring now to the drawings, there is shown in FIGS. 2 to 4 a joint construction of a pipeline of exhaust pipes or the like according to one preferred embodiment of the present invention which generally includes a pipeline portion 1 of an exhaust pipe having a catalytical converter 1a, a pipeline portion 2 of an exhaust pipe coupled with the pipeline portion 1, and flanges 3 and 4 provided at each end of the pipeline portions 1 and 2, respectively. The flanges 3 and 4 which are formed by a plate material are secured, at cylindrically-pressed boss portions 3a and 4a thereof, to the pipeline portions 1 and 2, respectively, for example, by welding so that respective flat surfaces 300 and 400 of the flanges 3 and 4 may be directed at right angle with respect to the axis of centerline l of the pipeline and also in parallel with respect to each other. On both sides of the flanges 3 and 4 with respect to the centerline l, there are provided deformed portions 3b, 3b, 4b and 4b each having an angular or V-shaped cross-section and bent or inclined so as to extend outwardly in the directions opposite to each other. Meanwhile, the deformed portions 3b and 4b confronting each other are respectively provided with flat bearing surfaces 3c and 4c with which fastening members come into contact during the coupling and the bearing surfaces 3c and 4c are formed to be inclined with respect to the pipeline axis l and to be parallel with each other. The axis p of a bolt 5 which intersects the flat bearing surfaces 3c at right angle therewith crosses a floor i, i.e., a horizontal plane (road surface) at an angle α. The bolt 5 and the nut 6 comprising the fastening members are brought into contact with the bearing surfaces 3c and 4c and then, the nut 6 is screwed on the bolt 5 and thus, both the flanges 3 and 4, i.e., both the pipeline portions 1 and 2 are coupled to each other.

In the manner as described above, the joint construction of a pipeline of exhaust pipes or the like according to one preferred embodiment of the present invention has been constituted. Meanwhile, the flanges 3 and 4 are respectively provided with ribs 30 and 40 to ensure their strength and a gasket 7 for gas sealing is inserted between the flanges 3 and 4, while the flat surfaces 300 and 400 form annular sealing surfaces K with respect to the gasket 7, around openings of the boss portions 3a and 4a, respectively. The boss portions 3a and 4a, deformed portions 3b and 4b, bearing surfaces 3c and 4c, and ribs 30 and 40 are formed by press work of metallic plates, so that the flanges 3 and 4 are exactly the same in configuration to ensure interchangeability therebetween. The angle of inclination of the bearing surfaces 3c and 4c with respect to the pipeline axis l is not particularly limited, but may be selected as desired. However, the angle α which the axis p of the bolt 5 forms with the horizontal plane including the pipeline axis l (plane in parallel with the road surface) should preferably be set at approximately 5° to 30°. In the above case, it is desirable that the bolt axis p is parallel with a vertical plane including the pipeline axis l or directed outwardly with respect thereto so as to cross the plane at a certain angle.

Accordingly, in the foregoing embodiment of the present invention, the bearing surfaces 3c and 4c which come into contact with the fastening members (bolt 5 and nut 6) during the coupling of the flanges 3 and 4 are inclined with respect to the pipeline axis l, so that in cases where obstacles such as a floor or a shielding plate, etc. are present in the vicinity of the pipeline portions 1 and 2 (exhaust pipes), the tightening direction (i.e., the direction of the axis p of the bolt 5) of the fastening members (bolt 5 and nut 6) is not parallel with the pipeline axis l but is inclined with respect thereto so as to take the same direction as in the operation of the impact wrench from below the floor i, thus eliminating the need for the use of an impact wrench with a universal joint type socket to be used conventionally. Accordingly, the pipeline portions 1 and 2 can be securely coupled to each other by using an impact wrench with a straight (standard) type socket 8, shown, for example, by imaginary lines in FIG. 2 and the fastening members (bolts 5 and nut 6), without any interference with the pipeline portions 1 and 2 and other obstacles.

Thus, all the conventional disadvantages associated with the use of an impact wrench with a universal joint type socket are eliminated with a consequent reduction in the cost for tools owing to the improved service life of the socket, while mechanics are prevented from suffering from tendovaginitis. Furthermore, the nut 6 is not required to be temporarily installed on the bolt 5, and thus the improved working efficiency reduces the cost of labor, while the bolts are prevented from coming off for the greater working safety when loosening the coupling portions.

Meanwhile, since the bearing surfaces 3c and 4c are provided only at part of the flanges 3 and 4 (deformed portions 3b and 4b), i.e. on the clamping surfaces which are brought into contact with the fastening members (bolt 5 and nut 6), and moreover, formed, for example, by press work, they are readily formed without inviting any increase of labor in the manufacture. Furthermore, the deformed portion 3b and 4b having the bearing surfaces 3c and 4c, respectively are formed to have a V-shaped or angular cross-section bent to extend outwardly in the directions opposite to each other so as to increase the strength of the coupling portions, while the coupling strength of the fastening member (bolt 5 and nut 6) is increased by a hollow portion formed between the deformed portions 3b and 4b. Alternatively, only the deformed portions 3b and 4b may be formed of members separate from the flanges 3 and 4 and then welded to said flanges 3 and 4, respectively.

Referring to FIG. 5 illustrating a joint construction of a pipeline of exhaust pipes or the like according to a modification of the present invention, the modified joint construction generally includes pipeline portions 1' and 2', and flanges 3' and 4' having boss portions 3'a and 4'a rigidly connected to respective ends of the pipeline portions 1' and 2'. On both ends of the flanges 3' and 4' with respect to the pipeline axis l, inclined portions 3'b and 4'b are formed to be inclined with respect to the pipeline axis l and to be parallel with each other. Furthermore, the flanges 3' and 4' include bearing surfaces 3'c and 4'c with which fastening members (bolt 5 and nut 6) come into contact during the coupling thereof. The bearing surfaces 3'c and 4'c are inclined with respect to the pipeline axis l, that is, the axis p of the bolt 5 is inclined with respect to the pipeline axis l, thereby producing the same functions and effects as those of the embodiment of FIGS. 2 to 4 described earlier. In this case, the axis p of the bolt 5 and the pipeline axis l are on the same plane in almost parallel with the road surface.

It should be noted here that, although in the preferred embodiments of the present invention described so far, the fastening members include the bolt 5 and the nut 6, it goes without saying that the concept of the present invention may also be applied to various other cases where a single bolt, a screw, or other conventional fastening members, with the same functions and effects being achieved as in the above described embodiments of the present invention.

Furthermore, it should also be noted that, although exhaust pipes of an engine system for a motor vehicle have been cited as the pipeline portions 1 and 2 in the foregoing embodiments, the present invention, needless to say, is readily applicable to joint constructions of other various pipelines instead of those for motor vehicles.

Although the present invention has been fully described by way of example with reference to the accompanying drawings, it is to be noted that various changes and modifications will be apparent to those skilled in the art. Therefore, unless such changes and modifications otherwise depart from the scope of the present invention, they should be construed as included therein.

What is claimed is:

1. A pipeline joint construction for an exhaust pipeline having a first longitudinal axis, disposed beneath the floor of an automobile body structure, said construction comprising:
    two pipes;

two flange members having respective openings therein, said flange members being secured to respective one of said pipes with confronting ends of said pipes received in said openings;

a gasket sandwiched between said flange members; and at least two fastening members, each including a headed bolt and a nut, for fastening said flange members together with said gasket clamped therebetween to connect said pipes together, each of said flange members having a flat portion located circumferentially of and extending perpendicularly to the longitudinal axis of the opening thereof and extending perpendicularly to the longitudinal axis of the corresponding pipe received thereby, said flat portion defining a gas seal face held in contact with said gasket;

holes equal in number to the number of said fastening members for insertion therethrough of said headed bolts of said fastening members, said holes being defined in said flange members at respective positions laterally outwardly of said openings in a plane generally parallel to the floor of the automobile body structure; and bearing portions located circumferentially of and adjacent to the respective holes, said bearing portions having flat bearing faces each defined on the side of said each of said flange members opposite to the gas seal face thereof;

the heads of said bolts and said nuts abutting said flat bearing faces of said fastening members when said flange members are fastened together by said fastening members with said bolts passed through the respective holes and then threaded with the respective nuts; said flat bearing faces of the respective bearing portions of each of said flange members extending at respective angles of inclination to the longitudinal axis of the respective one of said pipes to which said each of said flange members is secured, such that when said flange members are fastened together, said bearing faces of the respective bearing portions of one of said flange members face slantingly upward in a first direction toward the floor of the automobile structure and the bearing faces of the respective bearing portions of the other of said flange members face slantingly downward in a direction away from said floor of said automobile;

said bolts, when passed through the respective holes in said flange members, having their longitudinal axes extending at right angles to the corresponding flat bearing faces which the heads of said bolts and their respective nuts abut when said flange members are fastened together therewith, and being inclined relative to said first longitudinal axis of said pipeline and said plane, whereby the fastening of said fastening members to clamp said flange members together can be carried out from below the automobile body structure.

2. A pipeline joint construction as claimed in claim 1, wherein said bearing portions of each of said flange members are projections which protrude in directions away from the gas seal face of said each of said flange members and have flat surfaces which are parallel with each other.

3. A pipeline joint construction as claimed in claim 2, wherein said openings of said flange portions are formed cylindrically in the direction extending far away from said flat portions.

4. A pipeline joint construction as claimed in claim 3, wherein ribs are formed along the circumference of said flange members, at almost right angle therewith, and said ribs, said openings, and said bearing portions are formed of a metallic plate by press work.

5. A pipeline joint construction as claimed in claim 3, wherein said flange members are of the exact same profile for complete interchangeability therebetween.

6. A pipeline joint construction as in claim 2, wherein the longitudinal axes of said bolts are parallel to each other and extend at angles to at least one of said plane and the longitudinal axes of said pipeline which are in the range 5° to 30°.

7. A pipeline joint construction for an exhaust pipeline having a first longitudinal axis, disposed beneath the floor of an automobile body structure, said construction comprising:

two pipes;

two flange members having respective cylindrical openings therein, said flange members being secured to respective ones of said pipes with confronting ends of said pipes received in said openings;

a gasket sandwiched between said flange members; and at least two fastening members, each including a headed bolt and a nut, for fastening said flange members together with said gasket clamped therebetween to connect said pipes together; each of said flange members having a flat portion located circumferentially of and extending perpendicularly to the longitudinal axis of the opening thereof and extending perpendicularly to the longitudinal axis of the corresponding pipe received thereby, said flat portion defining a gas seal face held in contact with said gasket, holes equal in number to the number of said fastening members for parallel insertion therethrough of said headed bolts of said fastening members, said holes being defined in said flange members at respective positions laterally outwardly of said openings in a plane generally parallel to the floor of the automobile body structure, and bearing portions located circumferentially of and adjacent to the respective holes, said bearing portions projecting in a corresponding direction away from the gas seal face of said each of said flange members and having flat bearing faces each defined on the side of said each of said flange members opposite to the gas seal face thereof;

the heads of said bolts and said nuts abutting said flat bearing face of said fastenting members when said flange members are fastened together by said fastening members with said bolts passed through the respective holes and then threaded with the respective nuts, said flat bearing faces of said bearing portions of said two flange members being mutually parallel;

said flat bearing faces of the respective bearing portions of each of said flange members extending at respective angles of inclination to the longitudinal axis of the respective one of said pipes to which said each of said flange members is secured, such that when said flange members are fastened together, said bearing faces of the respective bearing portions of one of said flange members face slantingly upward in a first direction toward the floor of the automobile structure and the bearing faces of the respective bearing portions of the other of said flange members face slantingly downward in a direction opposite said first direction;

said bolts, when passed through the respective holes in said flange members, having their longitudinal axes extending at right angles to the corresponding flat bearing faces which the heads of said bolts and their respective nuts abut when said flange members are fastened together therewith, and being inclined relative to said first longitudinal axis of said pipeline and to said plane at equal angles which are in the range 5° to 30°, whereby the fastening of said fastening members to clamp said flange members together can be carried out from below the automobile body structure; said flange members including ribs formed along the circumference thereof at substantially right angles thereto; said ribs, the boundaries of said openings and said bearing portions being pressed from a metallic plate.

8. In an automobile having an exhaust pipeline extending along a first longitudinal axis beneath the floor of the automobile body structure, the improvement comprising a joint construction of the pipeline, the joint constructing including:

two flange members having respective openings therein, said flange members being secured to respective one of said pipes with confronting ends of said pipes received in said openings;

a gasket sandwiched between said flange members; and at least two fastening members, each including a headed bolt and a nut, for fastening said flange members together with said gasket clamped therebetween to connect said pipes together; each of said flange members having a flat portion located circumferentially of and extending perpendicularly to the longitudinal axis of the opening thereof and extending perpendicularly to the longitudinal axis of the corresponding pipe received thereby, said flat portion defining a gas seal face held in contact with said gasket, holes equal in number to the number of said fastening members for insertion therethrough of said headed bolts of said fastening members, said holes being defined in said flange members at respective positions laterally outwardly of said openings in a plane generally parallel to the floor of the automobile body structure, and bearing portions located circumferentially of and adjusted to the respective holes, said bearing portions having flat bearing faces each defined on the side of said each of said flange members oppposite to the gas seal face thereof;

the heads of said bolts and said nuts abutting said flat bearing faces of said fastening members when said flange members are fastened together by said fastening members with said bolts passed through the respective holes and then threaded with the respective nuts;

said flat bearing faces of the respective bearing portions of each of said flange members extending at respective angles of inclination to the longitudinal axis of the respective one of said pipes to which said each of said flange members is secured, such that when said flange members are fastened together, said bearing faces of the respective bearing portions of one of said flange members face slantingly upward in a first direction toward the floor of the automobile structure and the bearing faces of the respective bearing portions of the other of said flange members face slantingly downward in a second direction away from said floor of said automobile;

said bolts, when passed through the respective holes in said flange members, having their longitudinal axes extending at right angles to the corresponding flat bearing faces which the heads of said bolts and their respective nuts abut when said flange members are fastened together therewith, and being inclined relative to said first longitudinal axis of said pipeline, whereby the fastening of said fastening members to clamp said flange members together can be carried out from below the automobile body structure.

* * * * *